May 7, 1968  W. SCHAEDLER  3,382,389
COLD CATHODE IONIZATION GAUGE WITH A SEPARATE IONIZATION
CHAMBER CONNECTED TO THE MEASURING CHAMBER
Filed Feb. 1, 1967
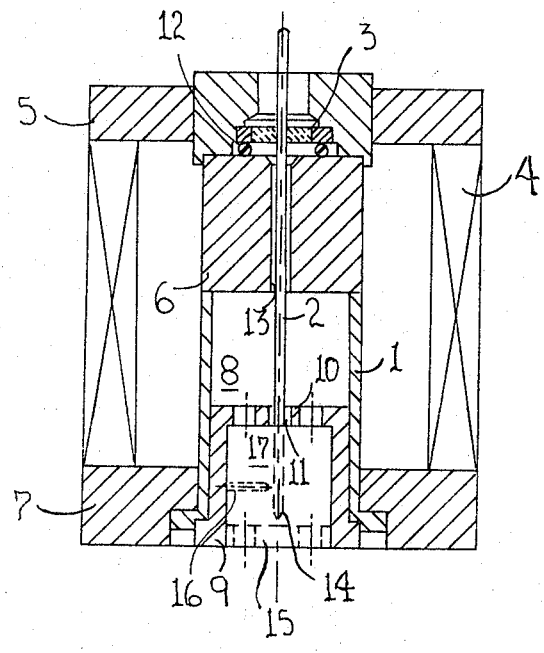
INVENTOR.
Walter Schaedler
BY
W. Schaedler 3,382,389
COLD CATHODE IONIZATION GAUGE WITH A SEPARATE IONIZATION CHAMBER CONNECTED TO THE MEASURING CHAMBER
Walter Schaedler, Triesen, Liechtenstein, assignor to The Bendix Corporation, Rochester, N.Y., a corporation of Delaware
Filed Feb. 1, 1967, Ser. No. 613,312
Claims priority, application Switzerland, Feb. 2, 1966, 1,499/66
4 Claims. (Cl. 313—7)

ABSTRACT OF THE DISCLOSURE

A cold cathode ionization gauge, according to the invention, which has a body defining a hollow cylindrical measuring space, an axailly-arranged, rod-shaped anode extending through the measuring space and an axial magnetic field. The invention is characterized by an external chamber connected to the measuring chamber by an opening and by the anode projecting into the external chamber.

In a particular form of the carrying out of the invention, it will be provided that the free end of the anode rod projects into a hole in the fixed side lying opposite to the face of the cathode cylinder formed as an external chamber.

---

The present invention concerns a cold cathode ionization gauge with a hollow cylindrical measuring space arranged axially, a rod-shaped anode and an axial magnetic field. As is well known, the cold cathode ionization gauge has the advantage over those with hot cathodes of being continuously ready for use. It is insensitive to the inrush of air and can be constructed very ruggedly so that it is very easy to dismantle and can be cleaned without danger of damaging it. However, it has the disadvantage, in comparison with the hot cathode ionization gauge, that a delay in ignition often occurs, especially in the neighborhood of the lower limit of the measurement range, which one has sought to eliminate through the provision of an ionizing agent (radioactive) in the measuring space. Apart from the radiation danger connected with it, the radioactive salts introduced on the inner walls of the measuring chamber are easily scrubbed off in cleaning.

It is the object of the present invention to so develop a cold cathode ionization gauge with the above-desired construction such that the measurement range is extended to lower pressures and a positive ignition is achieved.

A tested example of the execution of the invention will be described in more detail with the help of the accompanying drawing. 1 designates the housing of a hollow cylindrical measuring chamber which finds itself at the measuring potential and whose inner walls, in operation, represent a cold cathode with respect to the axially-arranged, rod-shaped anode 2. The anode is cantilever mounted from the high vacuum tight, potential lead-through 3 and projects through the central hole 13 of the part 6 into the measuring space 8 and beyond that into the hole 11 in the face 10 of the part 9 inserted into and/or removable from the housing 1, at which point the anode referred to may end the hole 10 as shown with solid lines or, as indicated dotted at 14 can be established in the hollow space formed in the part 9. The hole 11 and/or the referred to hollow space, in the sense of the patent claims, form the external chamber bordering the measuring space 8 which serves for the ignition of the gaseous discharge.

The housing 1 is further surrounded by an electro or permanent magnet 4 which produces an axial magnetic field in the measuring space whereby the magnetic circuit is closed through the flanges 5 and 7 and through the parts 6 and 9 which, for this reason, must be made of easily-magnetized materials.

The gauge described is flanged to an opening in the vacuum chamber by means of the flange 7 and for putting it into operation. The anode is supplied with an operating potential of plus 2,000 to plus 5,000 volts through the potential lead-through 3. After the ignition of the gaseous discharge, as is well known, a greater or lesser current flows through it according to the pressure prevailing in the measuring chamber (according to the vacuum in the order of magnitude of a fraction of a microampere to a few hundred microamperes) which is measured and serves as a measure for the degree of vacuum. The discharge begins in the external chamber, spreading immediately into the measuring chamber proper. The separation of the ignition space and the measuring space, proposed in accordance with the invention, brings with it the great advantage that without unfavorable distortion of the electric field in the measuring space and, thereby, the characteristic curve of the gauge, a positive ignition is possible even at low pressure (at $10^{-8}$ torr) in contrast to known ionization gauges in which the ignition of the discharge takes place in the measuring space itself. All of the auxiliary means for facilitating the ignition that are known to the expert can be provided in the external chamber acting as the ignition chamber; for example, sharp corners or a special electrode which is designated by 16. An auxiliary electrode would not be necessary if a second front end face, designated by 15, is available in the hollow space 17 and the sharp anode ends close before it. If the anode already ends in the hole 11, this acts as an ignition chamber. Practically, the ignition space will be small in comparison with the measuring space and formed with a weak magnetic field so that after the spreading of the discharge out of the ignition space into the measuring space, the current through the latter is large in proportion to the residual current through the ignition space. Thus, the construction suitable for the easy measurement of the two currents is saved, that is to say, the total current in this case is practically equivalent to the current through the measuring space alone.

The construction of the example of execution has the advantage that all parts are easily disassembled and, for that reason, can be easily cleaned. It has been shown that the rubber sealing rings can be used as the sealing material for the seal 12 which must seal the outer space against the vacuum in the usual high vacuum measuring range to about $10^{-8}$ torr. Metal seals are recommended for lower pressures.

The whole arrangement is held together by the flanges 5 and 7 and bolts which are not shown in the sketch. The additional holes in the wall 10 and 15, respectively, visible in the drawing, serve for more rapid ventilation. The gauge, in accordance with the invention, can be introduced into the same electrical circuit as also formerly used for the usual cold cathode ionization gauge.

I claim:

1. A cold cathode ionization gauge, a housing defining a hollow measuring space, a rod-shaped anode extending through said measuring space, means providing an axial magnetic field through said measuring space, the improvement comprising:
  means defining a separate ignition chamber connected through an opening to said measuring space; and said anode formed to project into said ignition chamber.

2. A cold cathode ionization gauge as claimed in claim 1 wherein:
  said housing defines a cylindrical measuring space with the interior walls forming a cylindrical cathode.

3. A cold cathode ionization gauge as claimed in claim 2 wherein said means defining a separate ignition chamber comprises a removable wall member insertable in said cylindrical interior walls to define one end of said measuring space and said ignition chamber.

4. A cold cathode ionization gauge as claimed in claim 3 wherein said ignition chamber is out of the main path of said axial magnetic field.

References Cited

UNITED STATES PATENTS

| | | | |
|---|---|---|---|
| 2,941,099 | 6/1941 | Picard et al. | 313—7 |
| 3,171,081 | 2/1965 | Garwood | 313—7 X |
| 3,244,990 | 4/1966 | Herb et al. | 313—7 X |
| 3,267,313 | 8/1966 | Kreisman | 313—7 |

JAMES W. LAWRENCE, *Primary Examiner.*

C. R. CAMPBELL, *Assistant Examiner.*